J. B. KING.
SHOCK ABSORBING SPRING FOR VEHICLES.
APPLICATION FILED NOV. 15, 1913.
1,107,964.
Patented Aug. 18, 1914.
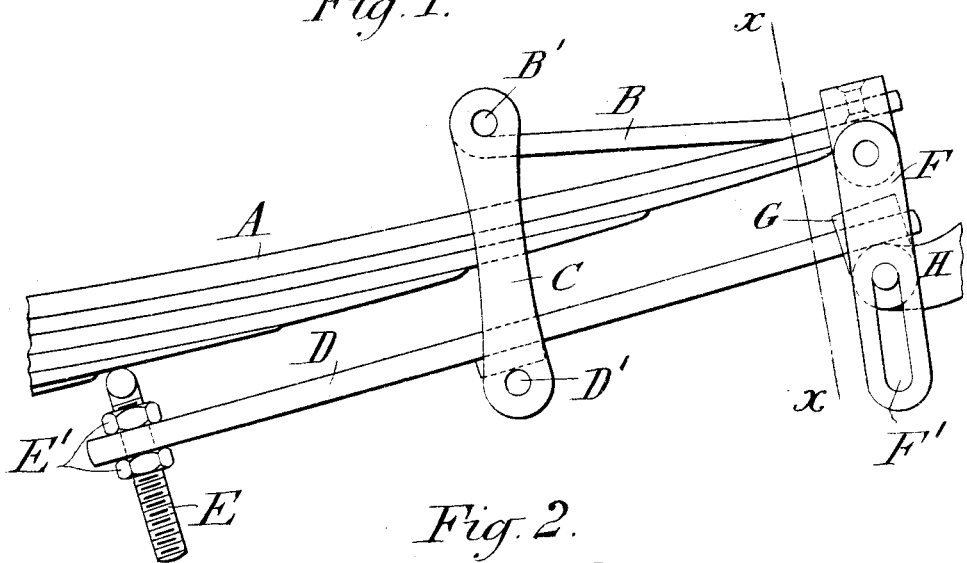
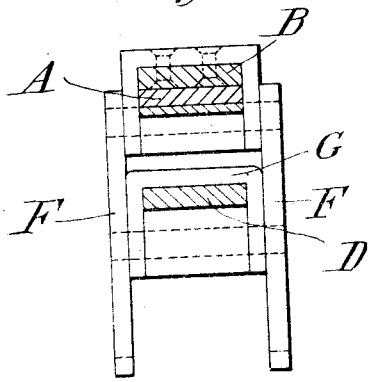
Witnesses:
M. E. McDade
C. J. Kasler
Inventor
John B. King
by James L. Norris
Attorney

UNITED STATES PATENT OFFICE.

JOHN B. KING, OF LONDON, ENGLAND.

SHOCK-ABSORBING SPRING FOR VEHICLES.

1,107,964.  Specification of Letters Patent.  Patented Aug. 18, 1914.

Application filed November 15, 1913. Serial No. 801,177.

*To all whom it may concern:*

Be it known that I, JOHN BERNARD KING, subject of the King of Great Britain, residing at 15 Alwyne Place, Canonbury, London, N., England, have invented certain new and useful Improvements in or Relating to Shock-Absorbing Springs for Vehicles, of which the following is a specification.

This invention relates to improvements in the spring suspension of vehicles and more particularly to self-propelled vehicles by means of which the flexibility resiliency and strength of such springs is increased at the same time increasing the stability of the body of the vehicle, such springs possessing valuable shock-absorbing qualities.

My invention consists in applying on the upper side of the ordinary axle spring of the leaf type a supplementary spring which is firmly secured to the end of the above spring, the said supplementary spring extending toward the axle. This spring has an eye formed at the end thereof through which a bearing pin is passed, the pin serving to support link plates which connect the upper spring with a thicker plate spring below the leaf axle spring. This plate spring is secured at one end to a scroll iron or spring fixed to the body of the vehicle, the opposite end being provided with an adjustable set screw which bears against the underside of the leaf spring. The end of the leaf spring has slotted plates secured thereto, the slots in the plate engaging with a pin on the scroll iron or spring secured to the body of the vehicle.

In order that my invention may be readily understood reference is made to the accompanying drawings in which:—

Figure 1 is a side elevation of the shock-absorbing spring. Fig. 2 is a cross section thereof on line $x$—$x$ of Fig. 1.

A is an axle spring of the ordinary leaf type to the end of which I secure a single flat spring B in any suitable manner. This flat spring extends in an upward direction as shown, above the spring A, and at the end thereof I form an eye, through which I pass a pin B'. This pin passes through and suspends link plates C which connect the spring B with a thicker lever plate spring D by means of a pin or bolt D', one end of the spring D being connected by a shackle G to a scroll iron or spring H secured to the body of the vehicle. At the other end of the spring D I provide an adjustable set screw E with nuts E' for adjusting the screw E on the lower end of the auxiliary spring D to compensate for variations in weight of body and load. The slots F' in the links F permit the springs A and D to move independently of each other.

My invention operates in the following manner:—Under normal conditions or when only a slight shock occurs the main axle spring A is lifted and the shock partially transmitted to the supplementary spring B and spring D, the slots in the links F permitting the main spring and single spring B to act independently of spring D. Should however a violent shock occur the main spring A is driven up against the spring B and consequently the links C transmit the reduced shock to the spring D which in turn transmits the still further reduced shock to the body spring or scroll iron H. In the meantime the links F have risen to their fullest extent. But under ordinary conditions this would only occur occasionally, the tension on the spring D being adjusted by set screw E to meet all ordinary shocks.

I claim:—

1. A shock-absorbing device, comprising the combination with a main axle spring of leaf spring type, of a supplemental leaf spring arranged above the main spring and fixed to one end thereof, a plate spring arranged below the main spring linked intermediate its length to the supplemental spring and having one end thereof connected by a shackle to a suitable part of the frame of the vehicle, and its other end engaging against the main spring, and a pair of slotted links connecting the main spring to the shackle pin of the plate spring, substantially as set forth.

2. A shock-absorbing device, comprising the combination with a main axle spring of leaf type, of a supplemental leaf spring arranged above the main spring and fixed to one end thereof, a plate spring arranged below the main spring, linked intermediate its length to the supplemental spring, and having one end thereof connected by a shackle to a suitable part of the frame of the vehicle and its free end engaging against the main spring, adjusting means on the free end of the plate spring operable to set the same nearer to or farther from the main spring, and a pair of slotted links connecting the main spring and the shackle pin of the plate spring, substantially as set forth.

3. A shock-absorbing device comprising the combination with an axle leaf spring, of a supplementary spring located above said leaf spring, a thicker plate spring located beneath said leaf spring, attachment means fixing one end of the supplementary spring to the end of the leaf spring, attachment means connecting one end of the plate spring to a suitable part of the frame of the vehicle such as a scroll iron, a pair of slotted links connecting the end of the leaf spring to the latter having a pin which engages through the slot in each link on the scroll iron, a pair of link plates pivoted to the free end of the supplementary spring and to the plate spring, and an adjustable set screw on the free end of the plate spring, as set forth.

In testimony whereof I have hereunto set my hand in presence of two subscribing witnesses.

JOHN B. KING.

Witnesses:
J. GLOVER,
H. D. JAMESON.